United States Patent
McKenna et al.

(10) Patent No.: US 10,169,444 B2
(45) Date of Patent: Jan. 1, 2019

(54) AUTOMATED GENERATION OF CUSTOM DASHBOARDS FOR VIEWING APPLICATION PERFORMANCE DATA

(71) Applicant: INTERNATIONAL BUSINESS MACHINES CORPORATION, Armonk, NY (US)

(72) Inventors: Luke R. McKenna, Willetton (AU); Alexandra L. Thornton, Bicton (AU)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 15/237,420

(22) Filed: Aug. 15, 2016

(65) Prior Publication Data

US 2018/0046696 A1 Feb. 15, 2018

(51) Int. Cl.
*G06F 17/30* (2006.01)
*G06Q 10/10* (2012.01)

(52) U.S. Cl.
CPC .. *G06F 17/30598* (2013.01); *G06F 17/30551* (2013.01); *G06Q 10/10* (2013.01); *G06F 17/30604* (2013.01); *G06F 17/30705* (2013.01); *G06F 17/30867* (2013.01)

(58) Field of Classification Search
CPC ........ G06F 17/30598; G06F 17/30867; G06F 17/30604; G06F 17/30705; G06F 17/3028; G06F 17/30991
USPC ....................... 707/737, 754, 999.009; 706/2
See application file for complete search history.

(56) References Cited

U.S. PATENT DOCUMENTS

| | | |
|---|---|---|
| 6,901,582 B1 | 5/2005 | Harrison |
| 9,274,758 B1 | 3/2016 | Qin et al. |
| 2006/0036463 A1* | 2/2006 | Patrick ................ G06F 21/6227 709/203 |
| 2006/0036595 A1 | 2/2006 | Gilfix et al. |
| 2010/0274596 A1 | 10/2010 | Grace et al. |
| 2015/0058092 A1 | 2/2015 | Rea et al. |
| 2016/0104076 A1* | 4/2016 | Maheshwari ........ G06N 99/005 706/12 |

(Continued)

OTHER PUBLICATIONS

Appdynamics, Custom Dashboards—4.1. x Documentation, https://docs.appdynamics.com/display/PRO41/Custom+Dashboards, Last accessed May 19, 2016, 5 pages.

(Continued)

*Primary Examiner* — Dung K Chau
(74) *Attorney, Agent, or Firm* — Tutunjian & Bitetto, P.C.; Scott Dobson

(57) ABSTRACT

A method and system are provided. The method includes correlating end user response time monitoring data from an end user response time monitoring system to an infrastructure ownership database. The method further includes correlating the infrastructure ownership database to an organizational structure, using a unique identifier available in both the infrastructure ownership database and the organizational structure. The method also includes automatically creating, on a display device, a custom dashboard for a user logging into the end user response time monitoring system based on correlations resulting from the correlating steps. The custom dashboard shows application performance data for applications relevant to the user based on the hierarchical level of the user in the organizational structure.

20 Claims, 13 Drawing Sheets

(56) References Cited

U.S. PATENT DOCUMENTS

2016/0105334 A1* 4/2016 Boe .................. G06F 17/30386
                                                    707/601
2016/0269482 A1* 9/2016 Jamjoom ............ H04L 67/1095
2017/0083572 A1* 3/2017 Tankersley ........ G06F 17/30439

OTHER PUBLICATIONS

Microsoft System Center, 360 .NET Application Monitoring Dashboards in System Center 2012 SP1 https://technet.microsoft.com/en-us/library/jj614613, Last accessed May 19, 2016, 2 pages.

* cited by examiner

| Owner | System |
|---|---|
| Isaac | Linux01 |
| Isaac | Linux02 |
| Paula | AIX01 |
| Paula | AIX02 |
| Charlie | Windows01 |
| Sarah | IaaS-IDX-Win02 |

| Owner | System | Status | Up time (% available) | Average response time |
|---|---|---|---|---|
| Genie | | ⚠ | 87.5 | 0.08 |
| Bill | Cloud | ⚠ | 80 | 0.10 |
| Laurie | Legacy Systems | ☒ | 95 | 0.05 |

FIG. 7

| Owner | System | Status | Up time (% available) | Average response time |
|---|---|---|---|---|
| Sarah | IaaS | ☒ | 70 | 0.50 |
| | IaaS-IDX-Win02 | ☑ | 95 | 0.10 |
| Paula | Web Systems | ⚠ | 94 | 0.20 |
| Charlie | Monitoring | ☒ | 50 | 2.00 |

| Owner | System | Status | Up time (% available) | Average response time |
|---|---|---|---|---|
| Charlie | IaaS Monitoring | ☒ | 50 | 2.00 |
| | Windows01 | ☒ | 50 | 2.00 |

FIG. 11

AUTOMATED GENERATION OF CUSTOM DASHBOARDS FOR VIEWING APPLICATION PERFORMANCE DATA

BACKGROUND

Technical Field

The present invention relates generally to information processing and, in particular, to the automated generation of custom dashboards for viewing application performance data.

Description of the Related Art

Creating custom dashboards for monitoring application performance is an onerous task. While some performance management products include dashboards, such dashboards are all manually created. Thus, there is a need for an automated approach for generating dashboards for viewing application performance data.

SUMMARY

According to an aspect of the present principles, a method is provided. The method includes correlating end user response time monitoring data from an end user response time monitoring system to an infrastructure ownership database. The method further includes correlating the infrastructure ownership database to an organizational structure, using a unique identifier available in both the infrastructure ownership database and the organizational structure. The method also includes automatically creating, on a display device, a custom dashboard for a user logging into the end user response time monitoring system based on correlations resulting from the correlating steps. The custom dashboard shows application performance data for applications relevant to the user based on the hierarchical level of the user in the organizational structure.

According to another aspect of the present principles, a computer program product is provided for custom dashboard generation. The computer program product includes a computer readable storage medium having program instructions embodied therewith. The program instructions executable by a computer to cause the computer to perform a method. The method includes correlating end user response time monitoring data from an end user response time monitoring system to an infrastructure ownership database. The method further includes correlating the infrastructure ownership database to an organizational structure, using a unique identifier available in both the infrastructure ownership database and the organizational structure. The method also includes automatically creating, on a display device, a custom dashboard for a user logging into the end user response time monitoring system based on correlations resulting from the correlating steps. The custom dashboard shows application performance data for applications relevant to the user based on the hierarchical level of the user in the organizational structure.

According to yet another aspect of the present principles, a system is provided. The system includes a computing device having a processor, a memory, and a display device. The computing device is configured to correlate end user response time monitoring data from an end user response time monitoring system to an infrastructure ownership database. The computing device is further configured to correlate the infrastructure ownership database to an organizational structure, using a unique identifier available in both the infrastructure ownership database and the organizational structure. The computing device is also configured to automatically create, on the display device, a custom dashboard for a user logging into the end user response time monitoring system based on correlations resulting from the correlating steps. The custom dashboard shows application performance data for applications relevant to the user based on the hierarchical level of the user in the organizational structure.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 6 shows information for an infrastructure ownership database, in accordance with an embodiment of the present principles;

FIG. 7 shows a custom CEO dashboard view, in accordance with an embodiment of the present principles;

FIG. 9 shows a custom manager dashboard view, in accordance with an embodiment of the present principles;

FIG. 11 shows another custom systems engineer dashboard view, in accordance with an embodiment of the present principles;

DETAILED DESCRIPTION

The present principles are directed to the automated generation of custom dashboards for viewing application performance data.

In an embodiment, the present principles integrate data between an organizational structure, an infrastructure ownership database and End User Response Time monitoring data to automatically create or generate views or dashboards of the response time data, depending on a person's hierarchical level in an organizational structure.

Figure 1:
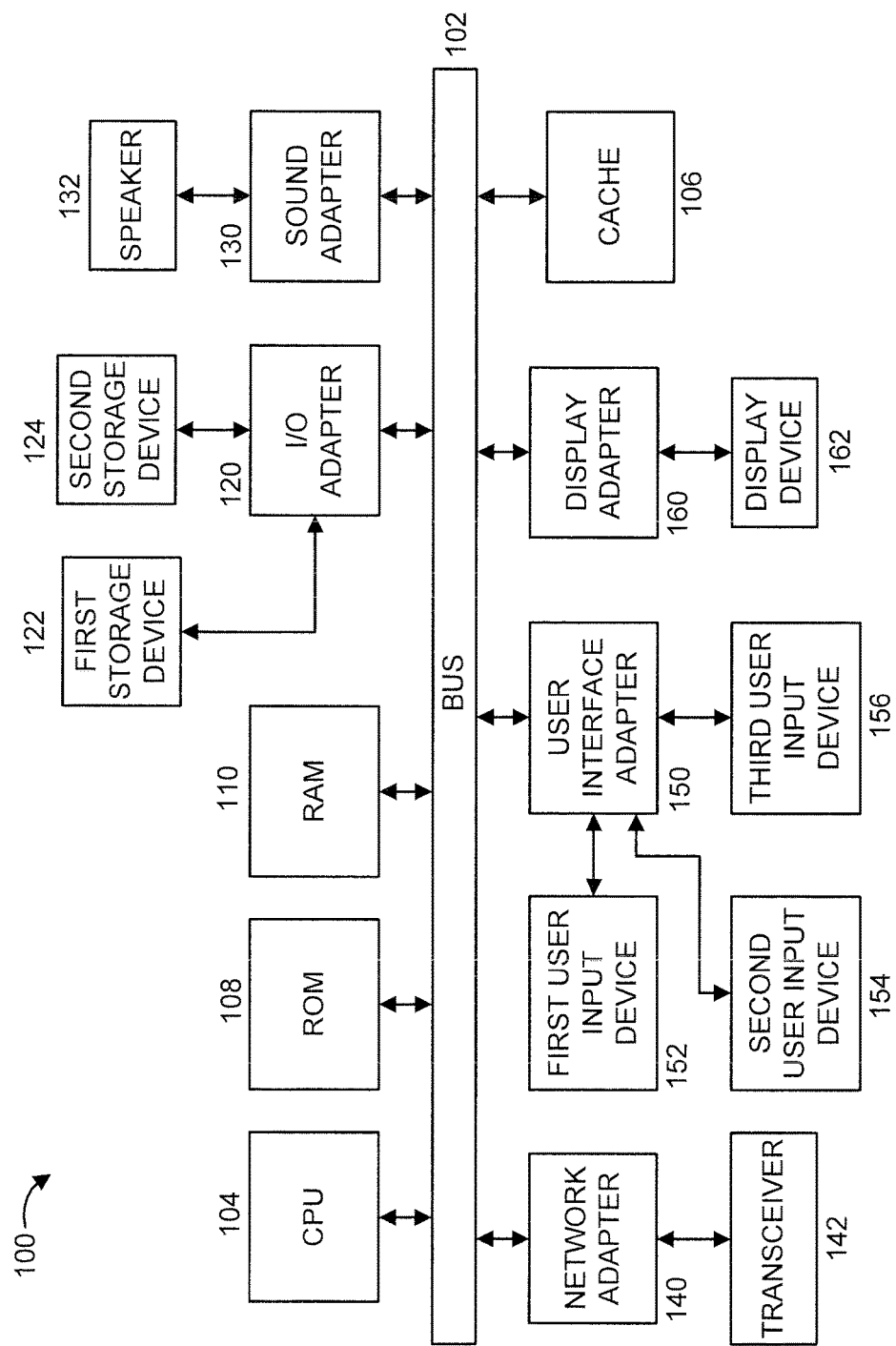
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
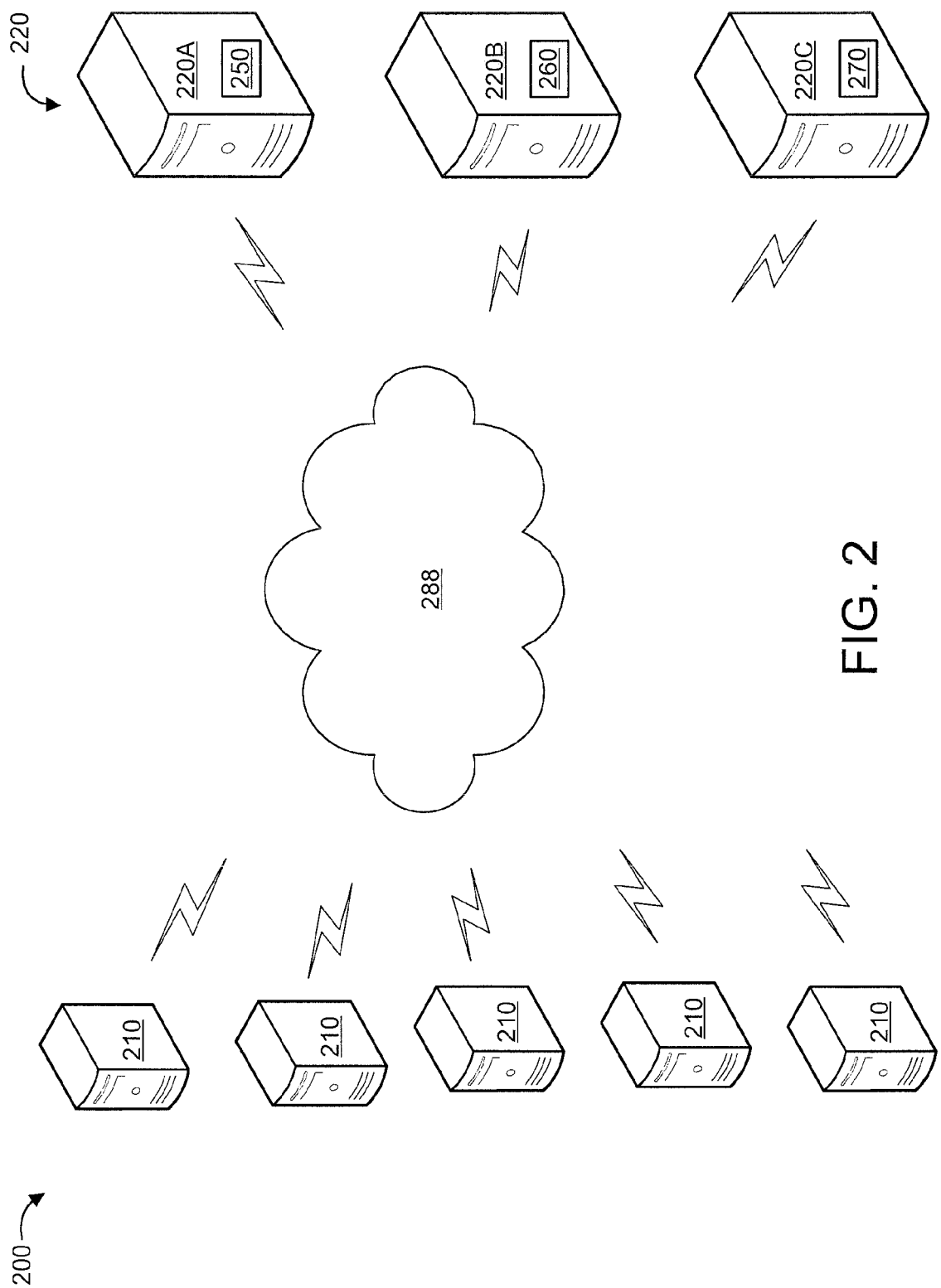
FIG. 2 shows an exemplary system to which the present principles can be applied, in accordance with an embodiment of the present principles.

Moreover, it is to be appreciated that environment 200 described below with respect to FIG. 2 is an environment for implementing respective embodiments of the present principles. Part or all of processing system 100 may be implemented in one or more of the elements of system 200.

Figure 3:
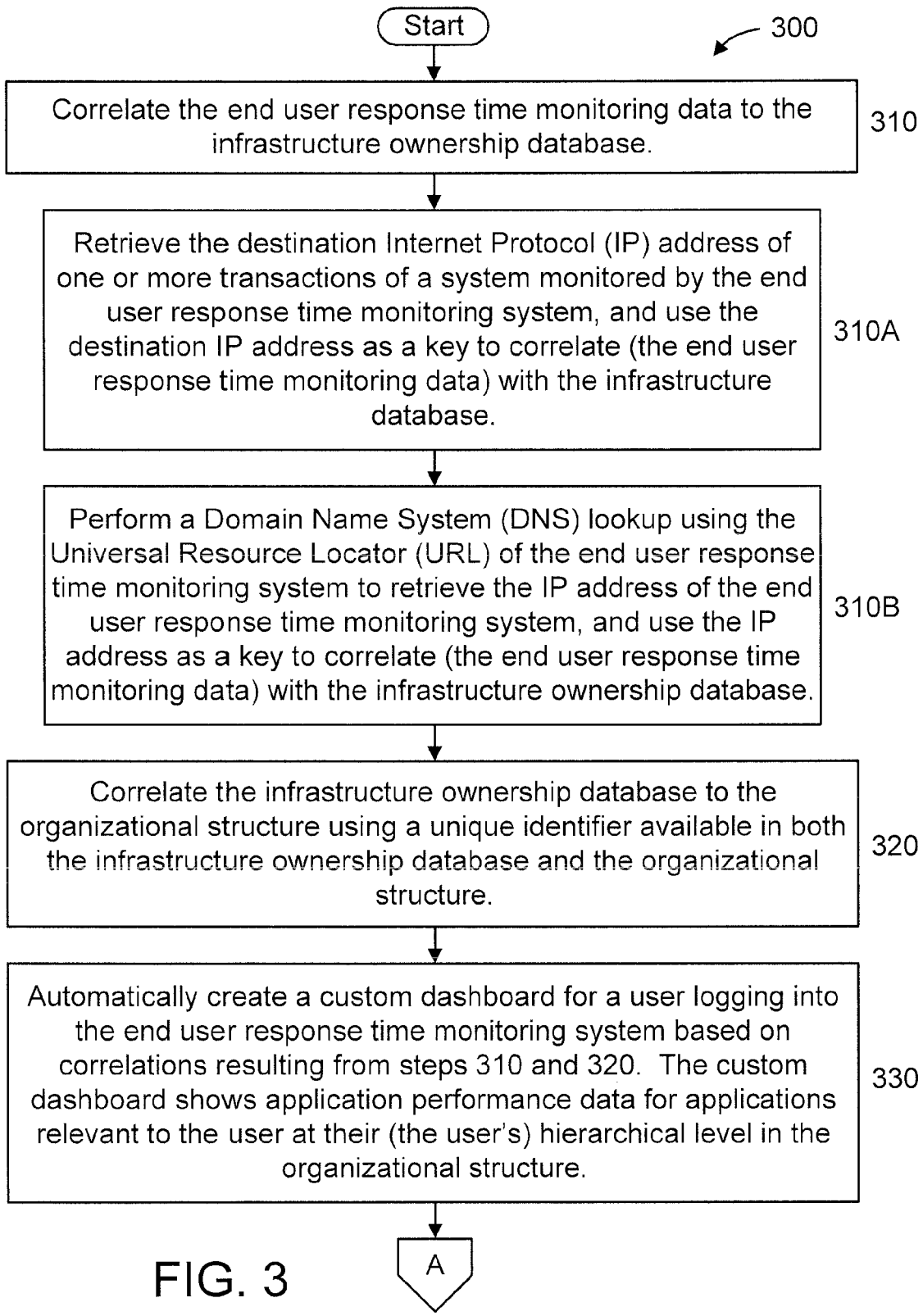
FIGS. 3-4 show an exemplary method for generating custom dashboards for viewing application performance data, in accordance with an embodiment of the present principles.
Figure 4:
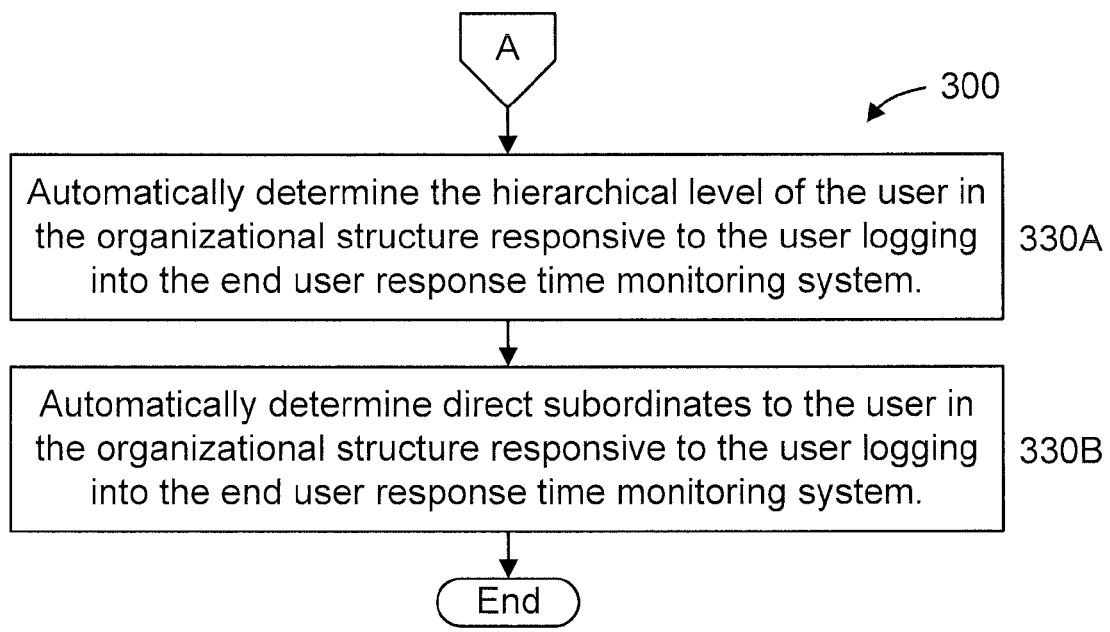

Further, it is to be appreciated that processing system 100 may perform at least part of the method described herein including, for example, at least part of method 300 of FIGS. 3-4. Similarly, part or all of environment 200 may be used to perform at least part of method 300 of FIGS. 3-4.

FIG. 2 shows an exemplary environment 200 to which the present principles can be applied, in accordance with an embodiment of the present principles.

The operating environment 200 includes a set of computing devices (collectively and individually denoted by the figure reference numeral 210). Any of computing devices 210 can be configured to implement the present principles.

The computing devices 210 can be any type of computing device capable of the steps of the present principles described herein. The computing devices 210 can be, but are not limited to, servers, desktop computers, mobile computers, smart telephones, media players, tablets, laptops, and so forth. For the sake of illustration, the computing devices 210 in the example of FIG. 2 are implemented by servers. The set of computing devices 210 correspond to individuals in an organization hierarchy.

In an embodiment, the computing devices 210 can access information on a set of other computing devices (e.g., servers, collectively denoted by the figure reference numeral 220 and individually by the figure reference numerals 220A, 220B, and 220C).

Computing device 220A includes an infrastructure ownership database 250. The infrastructure ownership database can be, but is not limited to, a software enterprise asset management system, such as the IBM® Maximo® Asset manager, and so forth.

Computing device 220B includes an end user response time monitoring system 260. The end user response time monitoring system 260 can monitor one or more user applications or one or more computing devices (e.g., that include one or more user applications). The monitored applications can be on any of computing devices 210 and/or 220. The monitored computing devices can be any of computing devices 210 and/or 220.

Computing device 220C includes data 270 for an organizational structure. The data can include, but is not limited to, hierarchy data for the individuals of the organizational structure. For example, the hierarchy data can specify a corresponding respective hierarchy level for each individual in the organizational structure. The organizational structure can be a company, a school, or any entity that involves different levels for different individuals, where the different levels are typically associated with different items (such as, e.g., but not limited to, different titles, different levels of responsibility, and/or so forth). In an embodiment, computing device 220C is a Lightweight Directory Access Protocol (LDAP) server or includes an LDAP database. Of course, other sources for the data can also be used.

It is to be noted that for the sake of illustration, separate computing devices 220A, 220B, and 220C respectively include the infrastructure ownership database 250, the end user response time monitoring system 260, and the data 270 for the organizational structure. However, in other embodiments, any one of computing devices 220A, 220B and/or 220C can include two or more of elements 250, 260 and 270. Moreover, in another embodiment, one or more of elements 250, 260, and/or 270 can be included in at least one of the computing devices 210. These and other variations of environment 200 are readily contemplated by one of ordinary skill in the art given the teachings of the present principles provided herein, while maintaining the spirit of the present principles.

The exchange of information between the set of computing devices 210 and/or between the set of computing devices 210 and the set of computing devices 220 can occur over one or more networks (collectively denoted by the figure reference numeral 288). The one or more networks 288 can include any type of networks such as, for example, but not limited to, cellular networks, local area networks, wide area networks, personal area networks, wireless networks, wired networks, any combination of the preceding, and so forth. In the embodiment of FIG. 2, the one or more networks 288 are implemented by one or more wireless networks for the sake of illustration.

In the embodiment shown in FIG. 2, the elements thereof are interconnected by network(s) 288. However, in other embodiments, other types of connections can also be used. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present principles provided herein, while maintaining the spirit of the present principles.

FIGS. 3-4 show an exemplary method 300 for generating custom dashboards for viewing application performance data, in accordance with an embodiment of the present principles.

In an embodiment, method 300 advantageously integrates data between an organizational structure (e.g., a full extract from a Lightweight Directory Access Protocol (LDAP) server), an infrastructure ownership database and end user response time monitoring data to automatically create and fill views or dashboards of response time data appropriate to that person depending on their hierarchical level in an organizational structure.

At step 310, correlate the end user response time monitoring data to the infrastructure ownership database.

In an embodiment, step 310 includes step 310A and/or step 310B.

At step 310A, retrieve the destination Internet Protocol (IP) address of one or more transactions of a system (hereinafter "monitored system") monitored by the end user response time monitoring system, and use the destination IP address as a key to correlate (the end user response time monitoring data) with the infrastructure database.

At step 310B, perform a Domain Name System (DNS) lookup using the Universal Resource Locator (URL) of the end user response time monitoring system to retrieve the IP address of the end user response time monitoring system, and use the IP address as a key to correlate (the end user response time monitoring data) with the infrastructure ownership database. In an embodiment, step 310B can be performed when the destination IP address of transactions of the monitored system is not available.

At step 320, correlate the infrastructure ownership database to the organizational structure using a unique identifier available in both the infrastructure ownership database and the organizational structure. In an embodiment, correlation can be achieved using, for example, an employee's serial number or email address.

At step 330, automatically create a custom dashboard for a user logging into the end user response time monitoring system based on correlations resulting from steps 310 and 320. The custom dashboard shows application performance data for applications relevant to the user at their (the user's) hierarchical level in the organizational structure. In an embodiment, the application performance data for a given application can include, but is not limited to, one or more of the following: (application) owner; direct subordinates to the owner; systems using the application; the operational status of the application; the up time (percentage of time available) of the application (aka amount of time of availability of the application); and the average response time of the application.

In an embodiment, step 330 includes steps 330A-B.

At step 330A, automatically determine the hierarchical level of the user in the organizational structure responsive to the user logging into the end user response time monitoring system.

At step 330B, automatically determine direct subordinates to the user in the organizational structure responsive to the user logging into the end user response time monitoring system.

Figure 5:
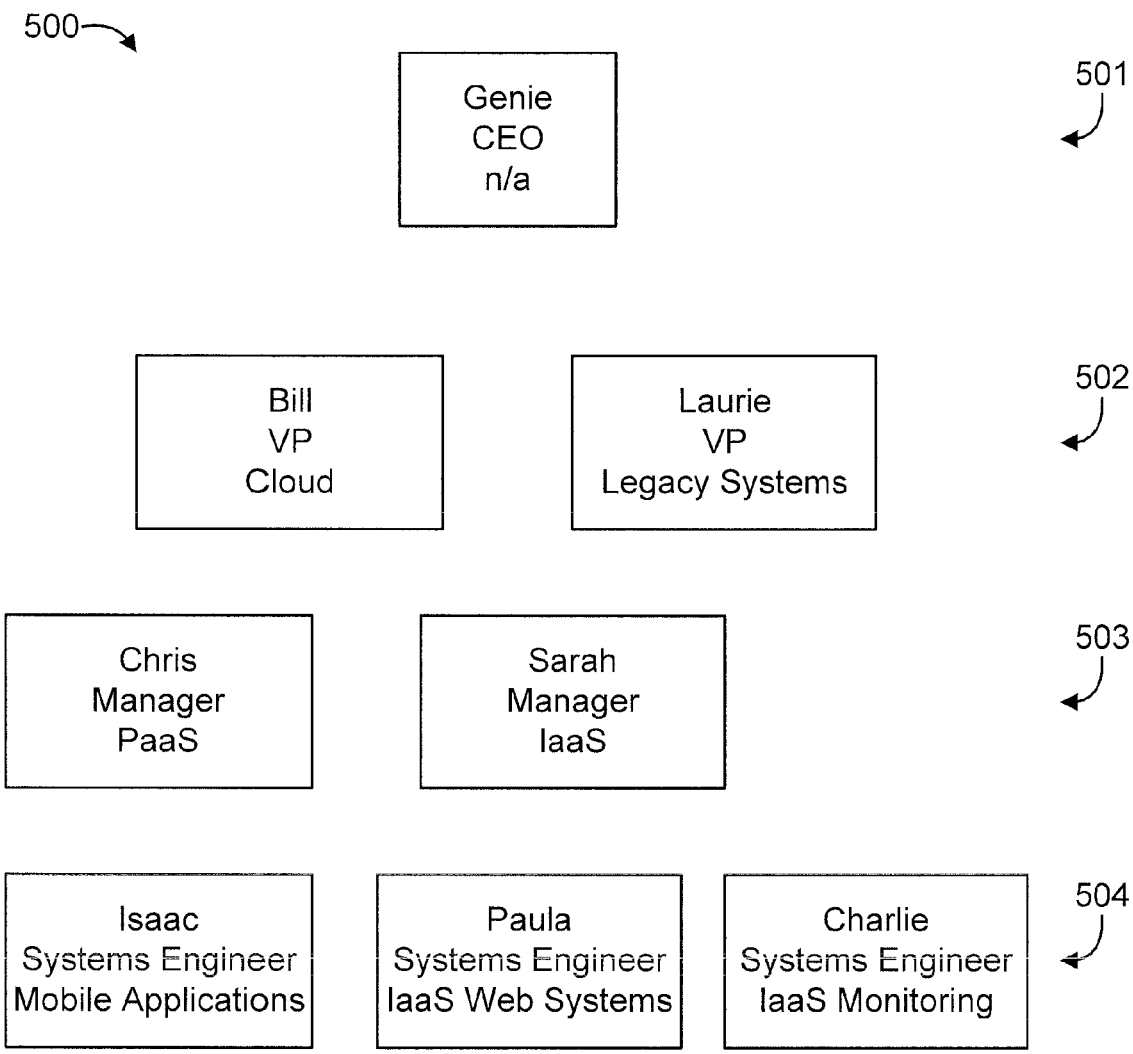
FIG. 5 shows an exemplary organizational structure to which the present principles can be applied, in accordance with an embodiment of the present principles.

FIG. 5 shows an exemplary organizational structure (e.g., LDAP) 500 to which the present principles can be applied, in accordance with an embodiment of the present principles.

The organizational structure 500 includes four levels, namely a first or top level 501, a second level 502, a third level 503, and a fourth or bottom level 504. At the first level 501, there is a CEO named Genie. At the second level 502, there is a vice president (of cloud computing) named Bill and a vice president (of legacy systems) named Laurie. At the third level 503, there is a manager (of PaaS) named Chris and a manager (of IaaS) named Sarah. At the fourth level 504 there is a systems engineer (for mobile applications) named Isaac, a systems engineer (for IaaS Web systems) named Paula, and a systems engineer (for IaaS monitoring) named Charlie.

FIG. 6 shows information 600 for an infrastructure ownership database, in accordance with an embodiment of the present principles.

The information 600 includes an owner column 601 and a system column 602. Isaac is associated with Linux01, and is also associated with Linux02. Paula is associated with AIX01 and also with AIX02. Charlie is associated with Windows01. Sarah is associated with IaaS-IDX-Win02.

FIG. 7 shows a custom CEO dashboard view 700, in accordance with an embodiment of the present principles.

The custom CEO dashboard view 700 includes an owner column 701, a system column 702, a status column 703, an up time (percent available) column 704, and an average (avg.) response time column 705.

The owner column 701 lists the CEO (Genie) and the persons (vice presidents Bill and Laurie) directly under (directly subordinate to) the CEO.

The system column 702 lists the system(s) associated with a given owner.

The status column 703 shows the current system status. A check mark in a box indicates a current satisfactory status, while an exclamation mark in a triangle indicates marginal performance (in between satisfactory and unsatisfactory), and an X in a box indicates a current unsatisfactory status.

The up time (percent available) column 704 indicates the amount of time (in a percentage) that a corresponding system (in the system column 702) is available for operation.

The average response time column 705 indicates the average time for a corresponding system (in the system column 702) or application on that system to respond.

Figure 8:
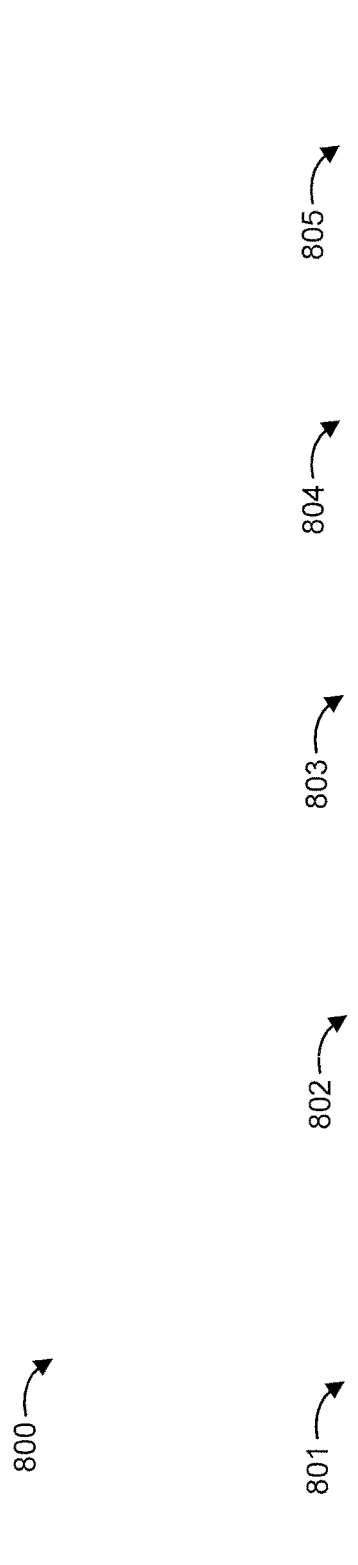
FIG. 8 shows a custom VP dashboard view, in accordance with an embodiment of the present principles.

FIG. 8 shows a custom VP (Vice President) dashboard view 800, in accordance with an embodiment of the present principles.

The custom VP dashboard view 800 includes an owner column 801, a system column 802, a status column 803, an up time (percent available) column 804, and an average (avg.) response time column 805.

The owner column 801 lists a particular VP (Bill) and the persons (managers Chris and Sarah) directly under (directly subordinate to) the particular VP.

FIG. 9 shows a custom manager dashboard view 900, in accordance with an embodiment of the present principles.

The custom manager dashboard view 900 includes an owner column 901, a system column 902, a status column 903, an up time (percent available) column 904, and an average (avg.) response time column 905.

The owner column 901 lists a particular manager (Sarah) and the persons (system engineers Paula and Charlie) directly under (directly subordinate to) the particular manager.

Figure 10:
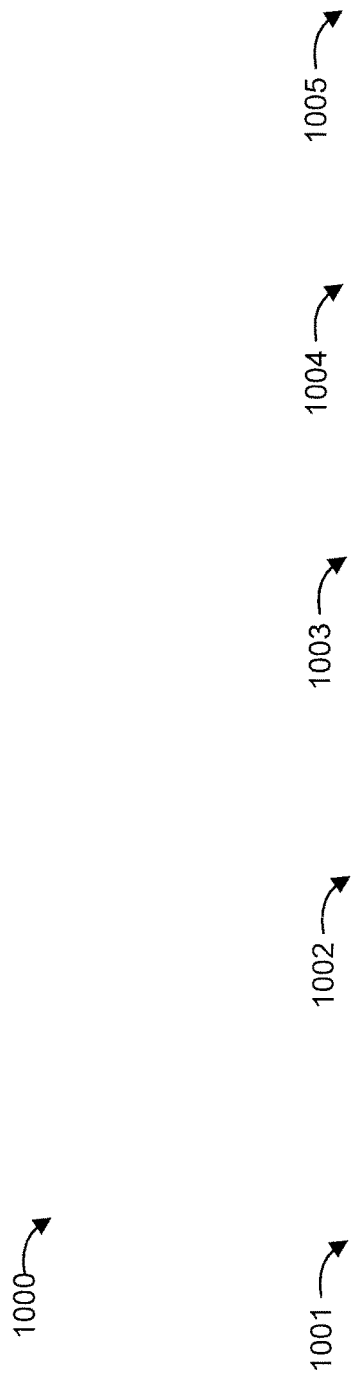
FIG. 10 shows a custom systems engineer dashboard view, in accordance with an embodiment of the present principles.

FIG. 10 shows a custom systems engineer dashboard view 1000, in accordance with an embodiment of the present principles.

The custom systems engineer dashboard view 1000 includes an owner column 1001, a system column 1002, a status column 1003, an up time (percent available) column 1004, and an average (avg.) response time column 1005.

The owner column 1001 lists a particular systems engineer (Paula) and the persons (none) directly under (directly subordinate to) the systems engineer.

FIG. 11 shows another custom systems engineer dashboard view 1100, in accordance with an embodiment of the present principles.

The custom systems engineer dashboard view 1100 includes an owner column 1101, a system column 1102, a status column 1103, an up time (percent available) column 1104, and an average (avg.) response time column 1105.

The owner column 1101 lists a particular systems engineer (Charlie) and the persons (none) directly under (directly subordinate to) the systems engineer.

An example will now be described with respect to at least some of FIGS. 5-11.

When CEO Genie logs into the "whole company application response time application", the system will have knowledge of her level in the organizational structure (using LDAP) (see, e.g., FIG. 5). At the same time, the system will have knowledge of every system that is owned by people in her organizational structure (e.g., by using enterprise asset management system) (see, e.g., FIG. 6). Thus, if 2 of her direct reports (i.e., direct subordinates) own servers running applications with end users or any of their reports (recursively down through the organizational structure), the response time statistics for those applications will show up in Genie's dashboard (see, e.g., FIG. 7).

For example, if one of manager Sarah's direct reports (i.e., direct subordinates), namely systems engineer Paula, owned 2 machines with end user applications, those 2 applications would be rolled up in an aggregate which would be labelled using her Department, e.g., "IaaS Web Systems" (see, e.g., FIG. 10). If another direct report owned an end user application, there would be two aggregates available in Sarah's dashboard with the second one labelled as the department ("Monitoring") of her second report (i.e., direct subordinate Charlie) (see, e.g., FIG. 9).

Further, using the same example, if Paula logged into the "whole company application response time application" she would see 2 applications, namely the two applications that she owns ("AIX01" and "AIX02") (see, e.g., FIG. 10).

Further, using the same example, if Sarah owns a machine serving an application that application would show up in her dashboard along with data of the applications her direct reports own (see, e.g., FIG. 9).

A description will now be given of some of the many attendant advantages/features of the present principles that are absent in the prior art.

As one advantage/feature, the present principles do not require any configuration to obtain the custom views described herein. Thus, for example, the CEO does not have to work out, select and/or otherwise determine which applications he or she is interested in. Rather, a basic aggregation algorithm be used to determine the same.

As another advantage/feature, it is very simple to determine who "to chase" if there are issues with end user response times, the owner of the rolled up data is a direct report—always. Thus, the user of the dashboard always knows exactly who to ask for answers if there are issues.

As yet another advantage/feature, the productization (into an application response time monitoring product) of this approach is fairly simple to deploy at customer sites. For example, the aggregation algorithm is the same, and just requires simple Application Programming Interface (API) integration with an organizational structure (noting, e.g., that LDAP would work "right out of the box") and a machine owner database (such as an enterprise asset management system, which has an API).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
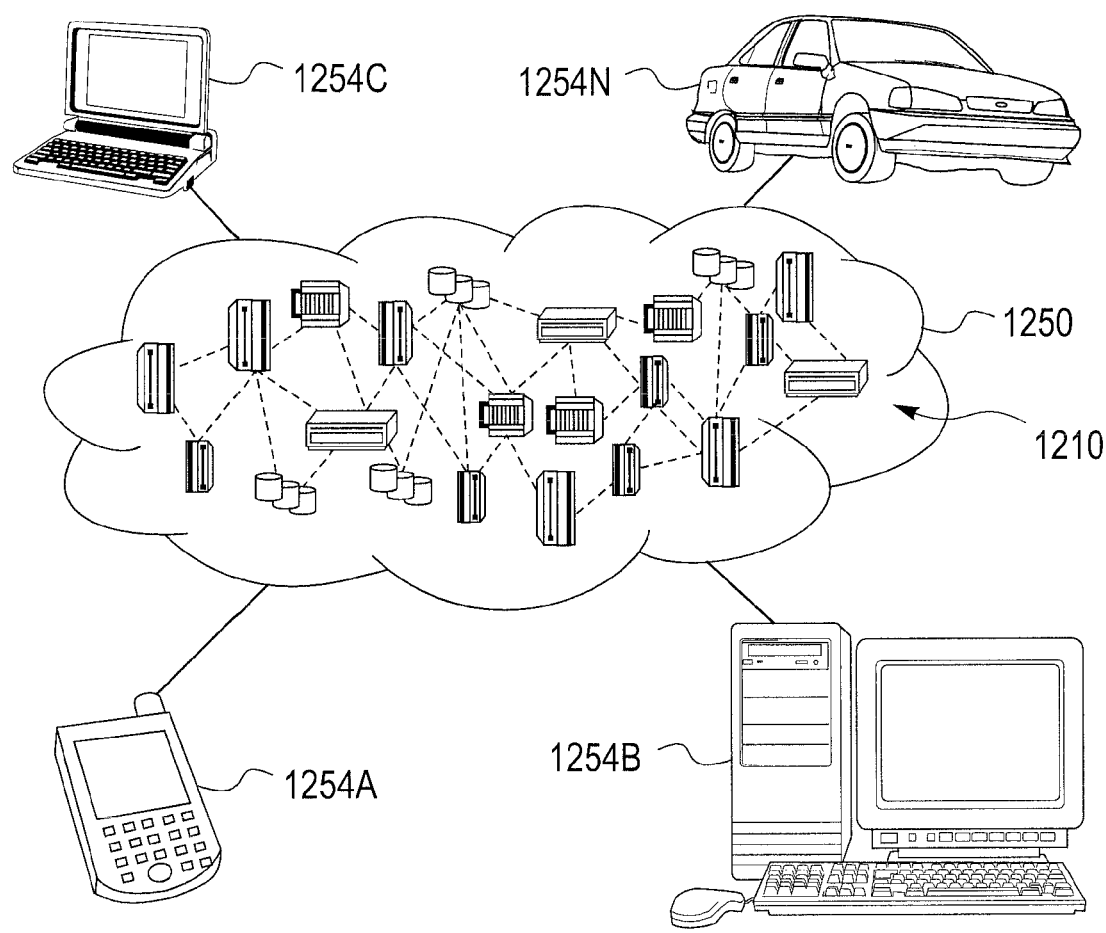
FIG. 12 shows an exemplary cloud computing environment, in accordance with an embodiment of the present principles.

Referring now to FIG. 12, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
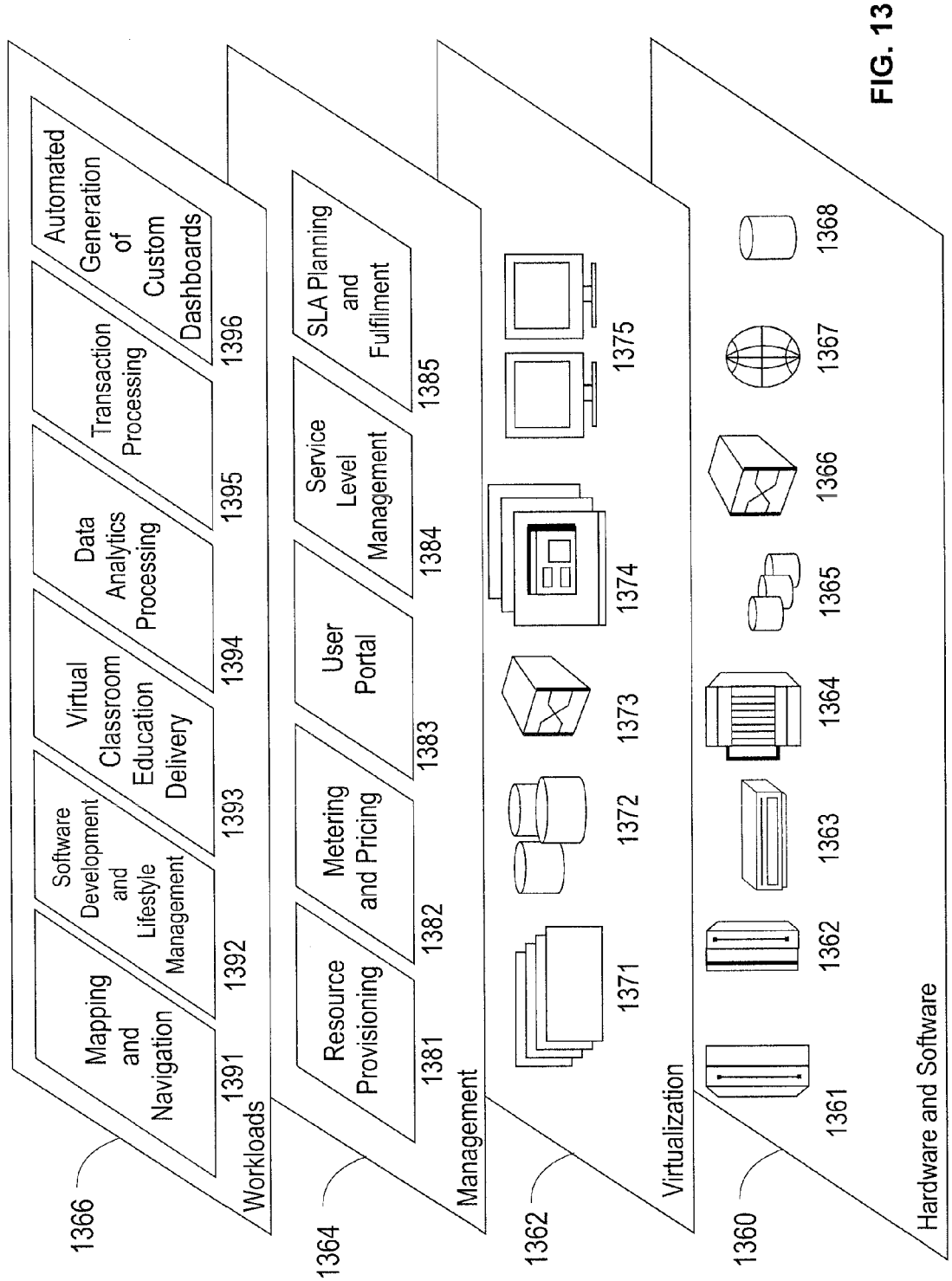
FIG. 13 shows an exemplary set of functional abstraction layers provided by the cloud computing environment shown in FIG. 12, in accordance with an embodiment of the present principles.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and automated generation of custom dashboards for viewing application performance data 1396.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method, comprising:
correlating end user response time monitoring data from an end user response time monitoring system to an infrastructure ownership database;
correlating the infrastructure ownership database to an organizational structure, using a unique identifier available in both the infrastructure ownership database and the organizational structure; and
automatically creating, on a display device, a custom dashboard for a user logging into the end user response time monitoring system based on correlations resulting from said correlating steps, wherein the custom dashboard shows application performance data for applications relevant to the user based on the hierarchical level of the user in the organizational structure.

2. The method of claim 1, wherein the correlating the end user response time monitoring data to the infrastructure ownership database comprises:
retrieving a destination Internet Protocol address of one or more transactions of a monitored system monitored by the end user response time monitoring system; and
using the destination Internet Protocol address as a key to correlate the end user response time monitoring data with the infrastructure database.

3. The method of claim 1, wherein the correlating the end user response time monitoring data to the infrastructure ownership database comprises:
performing a Domain Name System lookup using a Universal Resource Locator of the end user response time monitoring system to retrieve an Internet Protocol address of the end user response time monitoring system; and
using the IP address as a key to correlate the end user response time monitoring data with the infrastructure ownership database.

4. The method of claim 1, wherein the unique identifier available in both the infrastructure ownership database and the organizational structure comprises an identifier selected from the group consisting of an employee's serial number or an employee's email address.

5. The method of claim 1, wherein the application performance data for a given application is selected from the group consisting of an application owner, direct subordinates to the application owner, a system using the given application, an operational status of the given application, an availability of the given application, and an average response time of the given application.

6. The method of claim 1, wherein data for the organizational structure used for correlating the infrastructure ownership database to the organizational structure is obtained from a Lightweight Directory Access Protocol server.

7. The method of claim 1, further comprising:
automatically generating a label for an aggregation of two or more applications belonging to the user; and
displaying the label in the custom dashboard.

8. The method of claim 1, further comprising automatically determining the hierarchical level of the user in the organizational structure responsive to the user logging into the end user response time monitoring system.

9. The method of claim 1, further comprising:
automatically determining direct subordinates to the user in the organizational structure responsive to the user logging into the end user response time monitoring system; and
displaying information relating to the direct subordinates in the custom dashboard for the user.

10. The method of claim 1, further comprising:
automatically determining subordinates to the user that are at least partly responsible for the application performance data; and
displaying identifying information of the subordinates in the custom dashboard for the user.

11. A computer program product for custom dashboard generation, the computer program product comprising a non-transitory computer readable storage medium having program instructions embodied therewith, the program instructions executable by a computer to cause the computer to perform a method comprising:
correlating end user response time monitoring data from an end user response time monitoring system to an infrastructure ownership database;
correlating the infrastructure ownership database to an organizational structure, using a unique identifier available in both the infrastructure ownership database and the organizational structure; and
automatically creating, on a display device, a custom dashboard for a user logging into the end user response time monitoring system based on correlations resulting from said correlating steps, wherein the custom dashboard shows application performance data for applications relevant to the user based on the hierarchical level of the user in the organizational structure.

12. The computer program product of claim 11, wherein the correlating the end user response time monitoring data to the infrastructure ownership database comprises: retrieving a destination Internet Protocol address of one or more transactions of a monitored system monitored by the end user response time monitoring system; and using the destination Internet Protocol address as a key to correlate the end user response time monitoring data with the infrastructure database.

13. The computer program product of claim 11, wherein the correlating the end user response time monitoring data to the infrastructure ownership database comprises:
performing a Domain Name System lookup using a Universal Resource Locator of the end user response time monitoring system to retrieve an Internet Protocol address of the end user response time monitoring system;
and using the IF address as a key to correlate the end user response titre monitoring data with the infrastructure ownership database.

14. The computer program product of claim 11, wherein the unique identifier available in both the infrastructure ownership database and the organizational structure comprises an identifier selected from the group consisting of an employee's serial number or an employee's email address.

15. The computer program product of claim 11, wherein the application performance data for a given application is selected from the group consisting of an application owner, direct subordinates to the application owner, a system using the given application, an operational status of the given application, an availability of the given application, and an average response time of the given application.

16. The computer program product of claim 11, wherein data for the organizational structure used for correlating the infrastructure ownership database to the organizational structure is obtained from a Lightweight Directory Access Protocol server.

17. The computer program product of claim 11, wherein the method further comprises:
  automatically generating a label for an aggregation of two or more applications belonging to the user; and
  displaying the label in the custom dashboard.

18. The computer program product of claim 11, wherein the method further comprises:
  automatically determining direct subordinates to the user in the organizational structure responsive to the user logging into the end user response time monitoring system; and
  displaying information relating to the direct subordinates in the custom dashboard for the user.

19. The computer program product of claim 11, wherein the method further comprises:
  automatically determining subordinates to the user that are at least partly responsible for the application performance data; and
  displaying identifying information of the subordinates in the custom dashboard for the user.

20. A system, comprising:
  a computing device having a processor, a memory, and a display device, the computing device being configured to:
    correlate end user response time monitoring data from an end user response time monitoring system to an infrastructure ownership database;
    correlate the infrastructure ownership database to an organizational structure, using a unique identifier available in both the infrastructure ownership database and the organizational structure; and
    automatically create, on the display device, a custom dashboard for a user logging into the end user response time monitoring system based on correlations resulting from said correlating steps, wherein the custom dashboard shows application performance data for applications relevant to the user based on the hierarchical level of the user in the organizational structure.

\* \* \* \* \*